(12) United States Patent
Boura

(10) Patent No.: US 8,240,208 B2
(45) Date of Patent: Aug. 14, 2012

(54) GUIDING BLADE FOR A PROOF MASS AND MICROMACHINED ELECTROMECHANICAL SYSTEM USING SUCH BLADE

(75) Inventor: André Boura, Chatellerault (FR)

(73) Assignee: Thales, Neuilly sur Seine (FR)

( * ) Notice: Subject to any disclaimer, the term of this patent is extended or adjusted under 35 U.S.C. 154(b) by 474 days.

(21) Appl. No.: 12/520,290

(22) PCT Filed: Dec. 4, 2007

(86) PCT No.: PCT/EP2007/063267
§ 371 (c)(1),
(2), (4) Date: Oct. 28, 2009

(87) PCT Pub. No.: WO2008/074631
PCT Pub. Date: Jun. 26, 2008

(65) Prior Publication Data
US 2010/0199662 A1  Aug. 12, 2010

(30) Foreign Application Priority Data
Dec. 20, 2006  (FR) ..................... 06 11084

(51) Int. Cl.
*G01P 15/10*  (2006.01)
*G01P 15/097*  (2006.01)
(52) U.S. Cl. ............... 73/514.38; 73/514.29; 73/514.15
(58) Field of Classification Search ............. 73/514.29, 73/514.16, 514.36, 514.38, 514.01, 514.15, 73/514.34, 514.35, 504.12, 504.16, 504.04
See application file for complete search history.

(56) References Cited

U.S. PATENT DOCUMENTS

| | | | |
|---|---|---|---|
| 3,902,374 A | 9/1975 | Hoffman et al. | |
| 4,104,920 A | 8/1978 | Albert et al. | |
| 4,663,972 A * | 5/1987 | Gerard | 73/514.21 |
| 4,891,982 A | 1/1990 | Norling | |
| 4,920,800 A * | 5/1990 | Boura | 73/514.36 |
| 5,763,782 A * | 6/1998 | Moore et al. | 73/514.18 |
| 5,969,249 A * | 10/1999 | Roessig et al. | 73/514.15 |
| 7,124,633 B2 * | 10/2006 | Quer et al. | 73/514.15 |
| 7,360,422 B2 * | 4/2008 | Madni et al. | 73/504.12 |
| 2010/0089157 A1 * | 4/2010 | Quer et al. | 73/504.12 |

FOREIGN PATENT DOCUMENTS

FR  2 848 298 A1  6/2004
WO  WO 92/08139 A  5/1992

* cited by examiner

*Primary Examiner* — Helen C. Kwok
(74) *Attorney, Agent, or Firm* — Baker & Hostetler LLP

(57) ABSTRACT

A monolithic guiding blade for a mobile proof mass in a monolithic electromechanical system micro-machined in a plate having thickness H and defining plane O,x,y, the system including a base and a measurement cell including the proof mass connected to the base by the guiding blade and capable of translation displacement along axis Oy, the blade extending along axis Ox and connected to a fixed portion of the base, the blade limiting movement of the proof mass along axis Ox, comprising: a first hinge section shaped as a parallelepiped having thickness h long axis Oz, length I1 along axis Ox and width L along axis Oy; a central section essentially shaped as a parallelepiped having thickness h long axis Oz, length It along axis Ox and width Lt along axis Oy; and a second hinge section essentially in the shape of a parallelepiped having thickness h long axis Oz, length I2 along axis Ox and width L along axis Oy.

8 Claims, 3 Drawing Sheets

GUIDING BLADE FOR A PROOF MASS AND MICROMACHINED ELECTROMECHANICAL SYSTEM USING SUCH BLADE

CROSS-REFERENCE TO RELATED APPLICATIONS

This application is a national stage of International Application No. PCT/EP2007/063267, filed Dec. 4, 2007, which claims priority to foreign French Application No. FR 06 11084, filed Dec. 20, 2006, the disclosure of each application is hereby incorporated by reference in their entirety.

FIELD OF THE INVENTION

The field of the invention is that of micro-machined electromechanical systems including a proof mass capable of displacement.

The invention more particularly relates to a guiding blade of such an electromechanical system, confining a movement of the proof mass in a direction also called "sensitive axis" of the electromechanical system.

The invention also covers electromechanical systems micro-machined from a flat plate comprising a base and at least one measurement cell, which includes at least one proof mass and at least one guiding blade linking the proof mass and a fixed part to the base and acting on the movement of the proof mass. The operation of these systems is generally based on a measurement of an inertia force.

BACKGROUND OF THE INVENTION

Flat monolithic electromechanical systems, for example accelerometers micro-machined from a silicon wafer, conventionally comprise a body having a base and a measurement cell and often two measurement cells in order to implement a differential method. A measurement cell typically comprises a proof mass linked on the one hand to the base and on the other hand to a force sensor, itself also linked to the base. When the system is subjected to an acceleration along the sensitive axis which is the direction of the acceleration to be measured, the proof mass is subjected to an inertia force which is transmitted to the force sensor by means possibly making it possible to amplify the transmitted force.

The patent application FR 02 15599 describes an accelerometer whose measurement means comprise a resonator which can be a vibrating beam.

Hereinafter, the resonator will be exemplified by two beams forming a tuning fork, made to vibrate in phase opposition by means of two electrodes. It is this tuning-fork configuration which is represented in FIG. 1. Other resonator structures or a balance of forces could equally be used as measurement means. A vibrating-beam accelerometer preferably has two measurement cells which can be produced by micro-machining a substrate of silicon on insulator (SOI) or of quartz or another material, but other methods are also possible.

A silicon on insulator substrate comprises a wafer of silicon, possibly monocrystalline, measuring a few hundreds of micrometers thick (450 micrometers for example) forming the base of the accelerometer, which bears on its front face a thin layer of silicon oxide a few micrometers thick (2 micrometers for example) which is in turn covered by a layer of silicon a few tens of micrometers thick (60 micrometers for example), the silicon possibly also being monocrystalline.

The machining consists in etching the layers of silicon through their external face toward the layer of oxide, with a selective etching method which etches the silicon without significantly etching the oxide. The etching can be interrupted when the layer of oxide is exposed. This layer of oxide can in turn be removed locally by selective etching by another method so as to retain a link between the two layers of silicon only at a few selected points, and thus obtain the desired mobile planar structure.

Hereinafter a frame of reference O,x,y,z will be used. The plane of FIG. 1 is the plane O,x,y, the axis Oz representing the direction perpendicular to this plane. The axis Ox (respectively Oy, Oz) designates an axis parallel to the axis Ox (respectively Oy, Oz) represented in the figure.

The mobile planar structure 10 of a measurement cell of the accelerometer, diagrammatically represented in FIG. 1, comprises a mobile proof mass 1 capable of translation displacement along the sensitive axis of the accelerometer designated axis Oy, which is parallel to the acceleration γ to be measured, and means 2 of amplifying the force limiting this translation. This force is measured by means of two vibrating beams 30 placed along an axis Ox perpendicular to the axis Oy, which undergo a traction or a compression in the direction of the acceleration. The beams are arranged symmetrically relative to an axis of symmetry S of the structure, this axis of symmetry being parallel to the axis Oy and passing through the center of gravity of the mass.

The vibrating beams 30 are embedded at each end in a rigid termination 4. Each of these terminations 4 has a pair of micro-machined arms. The two pairs are symmetrical relative to the axis of symmetry S. A first micro-machined arm 5 links the termination 4 to the proof mass 1. A second micro-machined arm 6, symmetrical to the first arm relative to the axis of the beam, links the termination 4 to an anchoring foot 7 fixed to the base. These arms 5 and 6 are respectively linked to the proof mass, to the termination 4 and to the anchoring foot 7, by attachment points. The thickness of an arm 5 or 6 can vary over its length.

Also diagrammatically represented in FIG. 1 is a detail of part of the amplification means. The first arm 5 is articulated on the termination 4 by an attachment point A. Also represented is a part of electrode E. The two vibrating beams 30 are embedded in the termination 4 insofar as they are formed by etching for example, of the same layer of material. The section lines represent the material, monocrystalline silicon for example in the case of a cell produced by machining an SOI. As indicated previously, the surface patterns such as the arms 5, attachment point A, termination 4, beams 30 and electrode E, have been obtained by engraving the monocrystalline silicon then by etching the layer of oxide.

The angle α formed by the axis Ox and the line joining the attachment points A and B of the first arm 5 which, because of the symmetry of the arms 5 and 6 relative to the axis linking the terminations through their middle, is symmetrical with the angle formed by the axis Ox and the line joining the attachment points of the second arm 6. This angle α is relatively small and the traction or compression force exerted on the beams 30 is greater than the inertia force generated by the proof mass 1 in the presence of a sensitive acceleration directed along the axis Oy.

These amplification means 2 also make it possible to free space around the vibrating beams 30, notably to place the electrodes in the case of an electrostatic excitation. It will be recalled that the vibrating means are vibrated at their resonance frequency using electrodes arranged facing these beams, or directly on the beams, depending on whether it is an electrostatic or piezoelectric excitation.

The proof mass 1 is partially guided in translation along the axis Oy by the symmetry of the structure. To retain a degree of translation freedom solely along the axis Oy, it is also possible to limit the translations of the proof mass along Ox and Oz as well as rotations by employing one or more guiding blades 8 oriented along the axis Ox. A first end of this blade 8 is fixed to the proof mass 1, a second end of this blade 8 is fixed to a part 9, fixed to the base. Conventionally, the guiding blades 8 have a rectangular parallelepidedal form, with the longest side placed along the axis Ox.

FIG. 2 represents, in plan view, that is to say according to a projection in the plane O,x,y, a guiding blade 8 according to the prior art of a flat electromechanical system micro-machined from a wafer of monocrystalline silicon of constant thickness h. The guiding blade 8 comprises two anchorages and a section: the first anchorage is incorporated in the proof mass 1, a second anchorage is incorporated in the base.

As stated above, the section of a guiding blade of the prior art has a rectangular parallelepipedal form. The parallelepiped formed by the section of the blade 8 has a thickness along the axis Oz equal to the thickness of the substrate from which the electromechanical system is machined; for example h is equal to 60 micrometers.

The parallelepiped also has a length, along the axis Ox, equal to $I_1$, for example $I_1$ of the order of 700 micrometers, and a width along the axis Oy equal to L, for example L is close to 5 micrometers.

It is essential for the width L to be very small in order to present a very low resistance to a movement of the proof mass 1 in the direction Oy. The width L is generally given a value which is the minimum that can be reached with the available substrate machining technologies.

The dimensions of the guiding blade 8 give it a stiffness coefficient value along the axis Oy, $k_y$, that is extremely low, typically two orders of magnitude less than the stiffness along the axis Oy of the inertia force measuring device. On the other side of the coin, a guiding beam which has such a geometry has a critical buckling load that is very low along the axis Ox, typically corresponding to an acceleration of the order of 1000 g along the axis Ox, that is to say equal to a thousand times the acceleration of gravity on the Earth's surface. This therefore prohibits the use of such a guiding blade in a micro-machined electromechanical system which would be subjected to accelerations of the order of 20000 g along the axis Ox because, in this case, a buckling phenomenon would arise, and the guiding blade would be very greatly deformed and more than likely damaged.

To withstand such an acceleration along the axis Ox, it would be necessary for the width L of the blade along Oy to have a high value, for example greater than 50 micrometers for a length along the axis Ox that is unchanged in order to present a high critical buckling load along the axis Ox, which is incompatible with a low stiffness along the axis Oy.

The guiding blade according to the prior art, for example when it has a substantially parallelepipedal form, has a form that makes it unsuited to operation under a very high value acceleration along the axis Ox.

The aim of the invention is to overcome this drawback.

SUMMARY OF THE INVENTION

More specifically, the subject of the invention is a guiding blade for a mobile proof mass of an electromechanical system micro-machined from a plate of thickness h forming a plane O,x,y, the electromechanical system including a base and at least one measurement cell comprising the proof mass linked to the base by at least one guiding blade and capable of translation displacement along an axis Oy, said blade being positioned along an axis Ox and linked to a part fixed to the base, said blade limiting a movement of the proof mass along the axis Ox, M being a point positioned on the blade, an axis Oz being normal to the plane O,x,y and passing through the position of the point M, a plane M,y,z being a plane normal to the axis Ox and passing through the position of the point M, said blade being monolithic and having an overall length along the axis Ox equal to $L_L$, a central area of the blade being defined by a length greater than or equal to 15% of the overall length $L_L$ centered around a geometric center C of the blade, characterized in that a section $S_M$ of the blade along the plane M,y,z has an inertia relative to the axis Oz which has a value that varies according to the position M, and in that for points M positioned in the central area of the blade, the section $S_M$ has an inertia relative to the axis Oz which has a value greater than an average of the inertias relative to the axis Oz of the sections $S_M$ of the blade for all the points belonging to the blade.

According to a variant of the invention, the guiding blade consists, in succession:

of a first hinge section, of substantially parallelepipedal form, which has a thickness along the axis Oz equal to h, a length along the axis Ox equal to $I_1$ and a width along the axis Oy equal to L;

of a central section which has a thickness along the axis Oz equal to h, a length along the axis Ox equal to $I_t$, and a width along the axis Oy equal to $L_t$;

of a second hinged section, of substantially parallelepipedal form, which has a thickness along the axis Oz equal to h, a length along the axis Ox equal to $I_2$, and a width along the axis Oy equal to L.

According to a variant of the invention, the ratio between the width $L_t$ of the central section along the axis Oy and the width L of the first hinge section and/or that of the second hinge section is at least 5.

According to a variant of the invention, the width $L_t$ is of the order of 40 microns, the width L being of the order of 5 microns.

According to a variant of the invention there is approximately one order of magnitude between the sum of the lengths of the sections and the length of the first and second hinge sections.

According to a variant of the invention, the length of the first and second sections is of the order of 80 microns, the sum of the lengths of the sections being of the order of 1000 microns.

A first benefit of the guiding blade according to the invention stems from the fact that it withstands, without buckling, an acceleration along the axis Ox that can exceed 20000 g.

A second benefit of the guiding blade according to the invention stems from the fact that it has hinge sections which have a minimum width that can be reached with the current machining technologies and in that it has an overall length that is greater than the maximum length allowed by these machining technologies with this minimum width. Thus, for an overall blade length equal to that of a blade of the prior art, a blade according to the invention withstands, without buckling, an acceleration along the axis Ox, which is greater by a ratio of the order of fifteen than that supported by a blade of the prior art, at the cost of additional elastic return, still along the axis Oy, which remains limited to less than twice that of a blade of the prior art of the same overall length.

A third benefit of the guiding blade according to the invention makes it possible to eliminate the extra elastic return when the bulk given to the blade permits it; in practice, the value of a stiffness coefficient along the axis Oy $k_y$ of a blade according to the invention is reduced by elongation of the blade. For example, the value of a stiffness coefficient along the axis Oy $k_y$ of a blade according to the invention having a length of the order of 1000 micrometers, having hinge sections with a length of the order of 80 micrometers is of the same order of magnitude as that of a blade of the prior art with a length of 700 micrometers.

The invention also relates to an electromechanical system micro-machined from a plate of thickness h forming a plane O,x,y, the electromechanical system having a base and at least one measurement cell comprising a proof mass linked to the base by at least one blade for guiding the proof mass according to the invention, characterized in that the system is monolithic.

BRIEF DESCRIPTION OF THE DRAWINGS

Other features and benefits of the invention will become apparent from reading the detailed description below, given by way of non limiting example and with reference to the appended drawings in which.

From one figure to the next, the same elements are identified by the same references.

DETAILED DESCRIPTION

Figure 1:
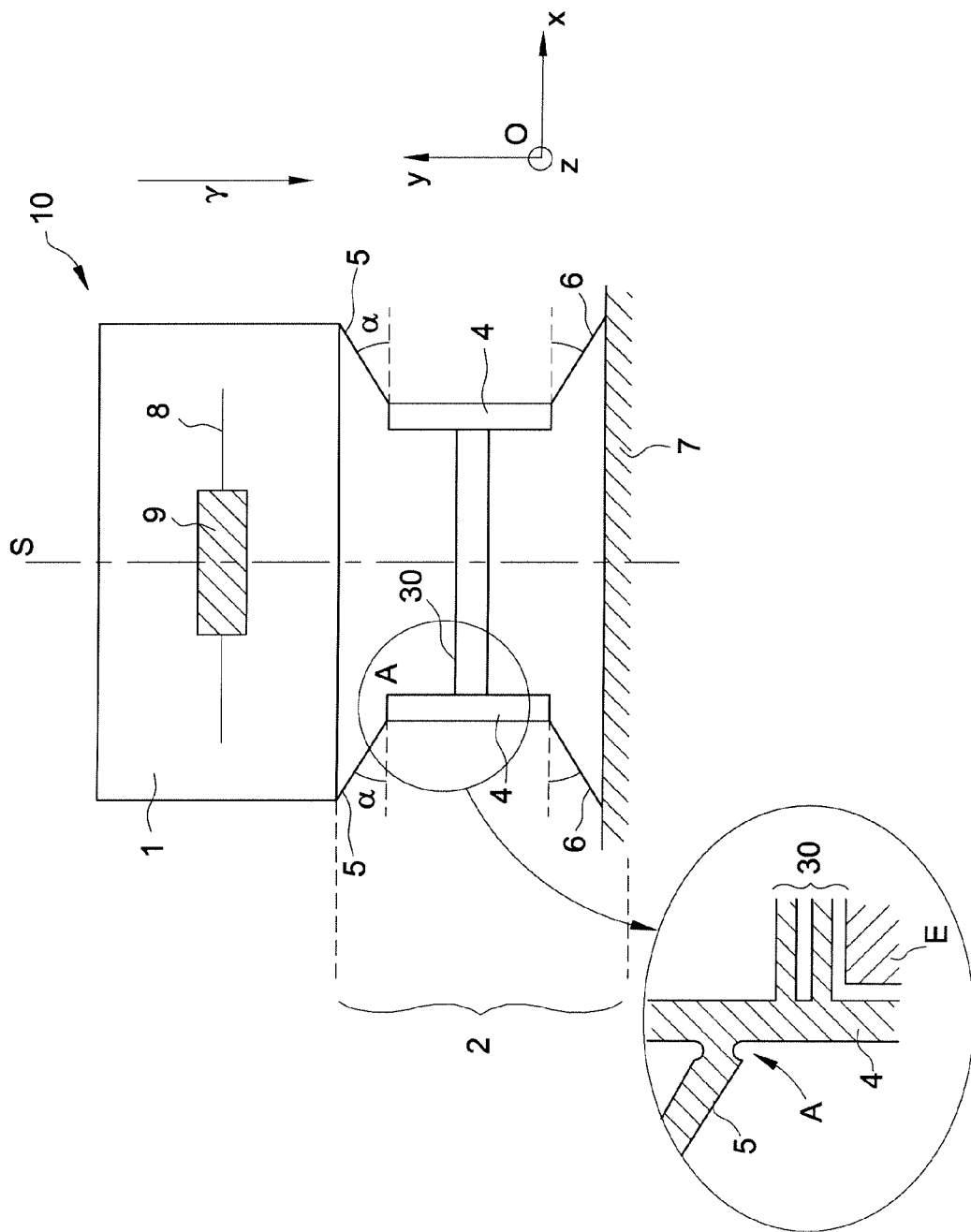
FIG. 1, already described, diagrammatically represents a measurement cell structure of an accelerometer, in which the proof mass is linked to a base by two guiding blades.
Figure 2:
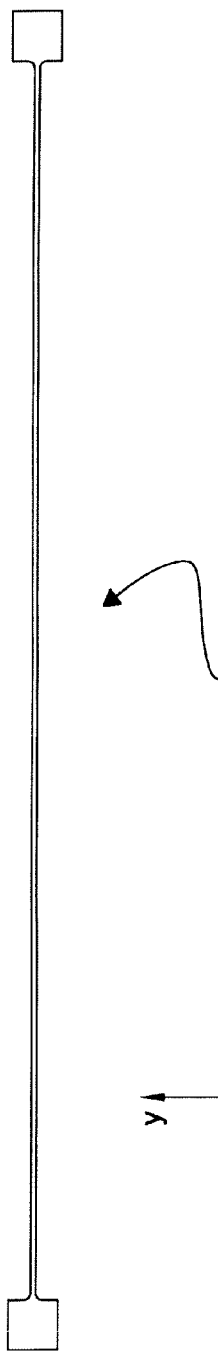
FIG. 2, already described, represents a plan view of a guiding blade of the prior art.
Figure 3:
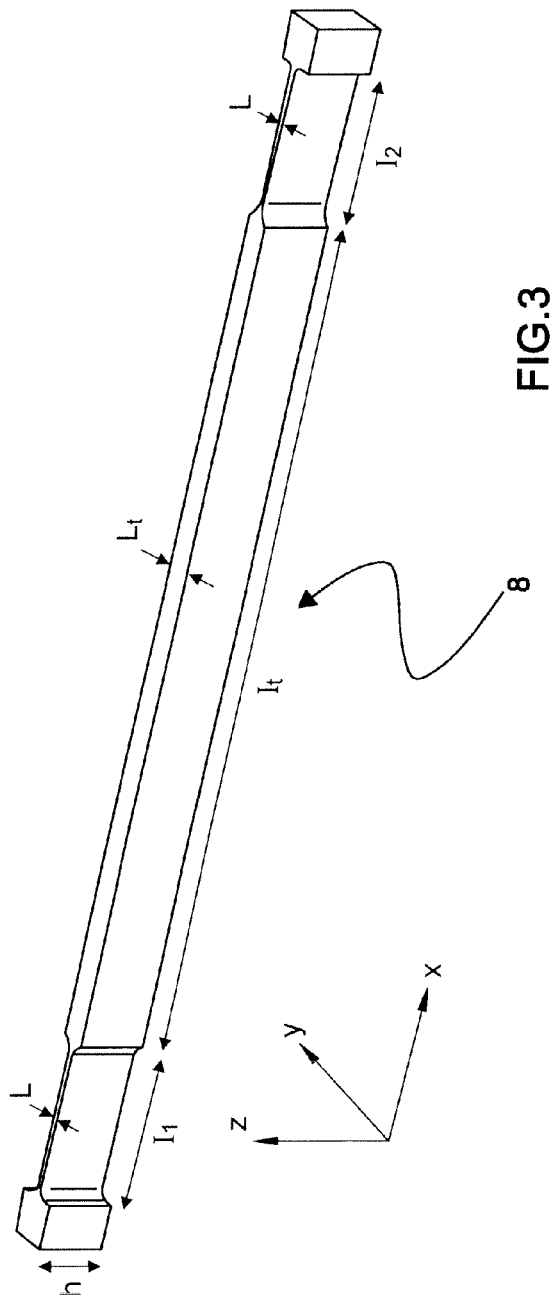
FIG. 3 represents a perspective view of an embodiment of a guiding blade according to the invention.

FIG. 3 represents a perspective view of an embodiment of a guiding blade according to the invention. This blade 8 is machined from a substrate of constant thickness, is part of a monolithic structure and consists, in succession:
- of a first hinge section, of substantially parallelepipedal form, which has a thickness along the axis Oz equal to h, a length along the axis Ox equal to $I_1$ and a width along the axis Oy equal to L;
- of a central section which has a thickness along the axis Oz equal to h, a length along the axis Ox equal to $I_t$, and a width along the axis Oy equal to $L_t$;
- of a second hinge section, of substantially parallelepipedal form, which has a thickness along the axis Oz equal to h, a length along the axis Ox equal to $I_2$, and a width along the axis Oy equal to L.

Furthermore, the guiding blade 8 has two anchorages arranged at two end of the blade: a first anchorage is incorporated in the proof mass 1, a second anchorage is incorporated in the base.

For example, h is equal to 60 micrometers, $I_1$ and $I_2$ are equal to 80 micrometers, L is equal to 5 micrometers, $L_t$ is equal to 40 micrometers and $I_t$ is equal to 660 micrometers.

To sum up, the guiding blade 8 according to the invention has a first and a second hinge section which each have the maximum width that is possible to achieve with the available silicon machining technologies, or of the order of 5 micrometers.

The guiding blade also has an overall length $L_L$ which is approximately 820 micrometers but which can be greater than the maximum length allowed by these same machining technologies for a part having this minimum width along the axis Oy.

Advantageously, the axis Ox and the axis Oy are orthogonal.

Advantageously, the width $L_t$ of the central section is greater than the width L of the first hinge section and of the second hinge section.

When the structure undergoes an acceleration along the axis Oy, the guiding blade is slightly deformed by double flexing, the first hinge section and the second hinge section each having a curvature of opposite sign. The invention consists in rigidifying the blade close the geometrical center C of the blade, that is to say, in increasing the inertia of the blade in a central area centered around the geometrical center C.

The critical buckling load is thus considerably increased (multiplied by approximately 18), thanks to the increase in the thickness of the central part on the one hand and to the shortening of the sections of small thickness remaining in place at each end on the other hand.

A beam such as that illustrated in FIG. 3 has a certain flexibility in the direction Y, despite the short length of the thinned end sections, because these sections are the areas most stressed in a translation of the proof mass in the direction Y. This flexibility is by no means as important as for a beam that is uniformly thin over its entire length (it is lessened by a factor of the order of 1.8 for the values cited). It is also, where appropriate, possible to compensate this loss of flexibility by elongating the thick part of the variable-section beam. The cooperative flexing deformation of the ends makes it possible to restore the initial flexibility to the guiding means produced.

In the case where the bulk is not limited, the selection of a configuration similar to that of FIG. 3 makes it possible to multiply the critical buckling load by a factor of the order of 20, while retaining the same flexibility in the direction Y, at the cost of an increase in the overall length of the guiding beam of the order of 30%.

Figure 4:
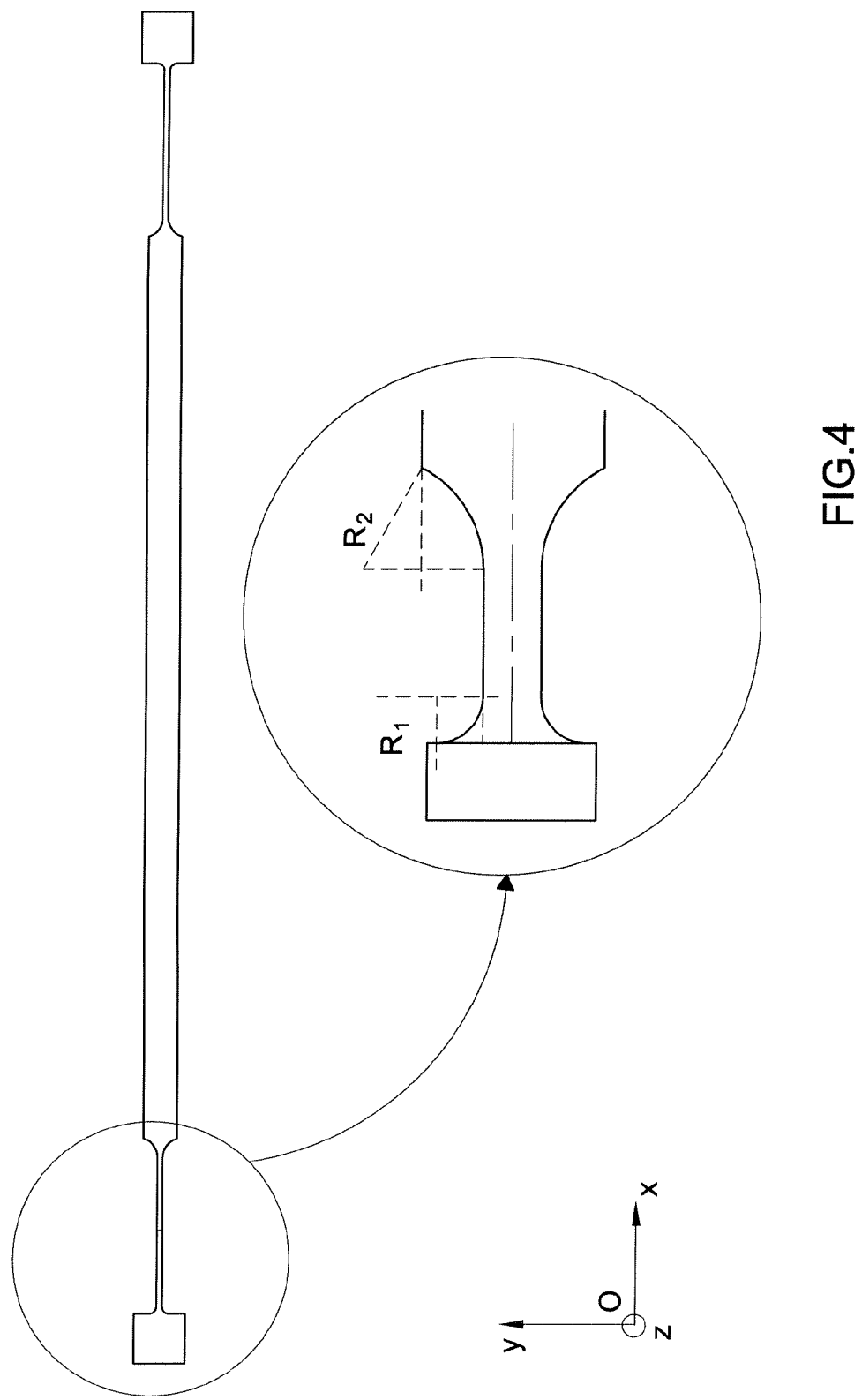
FIG. 4 represents a plan view of the embodiment of a guiding blade according to the invention.

For the embodiment of the blade represented in FIGS. 3 and 4, an increase in the inertia consists in providing the central section of the blade with a width $L_t$ along the axis Oy which is greater than the width L of the first and second hinge sections.

The additional mass provided by this widening of the central section can be reduced by drill-holes judiciously placed in the central section.

Advantageously, the central area of the blade includes drill-holes.

Advantageously, the guiding blade according to the invention is symmetrical relative to an axis parallel to the axis Oy and passing through the geometrical center C of the blade.

Advantageously, first fillets of radius $R_1$ connect the first hinge section and the central section and second fillets of radius $R_2$ connect the second hinge section and the central section.

Advantageously, the micro-machined electromechanical system is a resonating accelerometer.

Advantageously, the micro-machined electromechanical system is a vibrating gyrometer.

The invention claimed is:

1. A guiding blade for a mobile proof mass of an electromechanical system micro-machined from a plate of thickness h forming a plane O,x,y, the electromechanical system including a base and at least one measurement cell to measure forces acting on the proof mass in a direction Oy, said proof mass being capable of translation displacement in the direction Oy, and linked to the base by at least one guiding blade, said blade being arranged parallel to an axis Ox orthogonal to an axis Oy and linked to a part fixed to the base, said blade being monolithic and limiting a displacement of said proof mass in a direction Ox by deformation of said blade by traction or by compression in said direction Ox, the guiding blade further comprising, close to each of its ends, a hinge section with a reduced thickness in the direction Oy to limit the stiffness encountered by the proof mass being displaced in the direction Oy by cooperative deformation by double flexing of said hinge sections in the direction Oy of measurement of the inertia force, said sections of reduced thickness L surrounding a central section with a thickness $L_t$ that is greater in the direction Oy conferring on the guiding blade a critical buckling load that is increased by at least one order of magnitude in the direction Ox, while retaining for said guiding blade a flexibility of the same order of magnitude in the direction Oy.

2. The guiding blade as claimed in claim 1, wherein the central section of the blade includes drill-holes.

3. The guiding blade as claimed in claim 1, wherein said guiding blade is symmetrical relative to an axis parallel to the axis Oy and passing through a geometrical center C of said blade.

4. The guiding blade as claimed in claim 3, wherein the central section includes drill-holes.

5. The guiding blade as claimed in claim 2, wherein first fillets of radius $R_1$ connect a first hinge section and the central section and second fillets of radius $R_2$ connect a second hinge section and the central section.

6. An electromechanical system micro-machined from a plate of thickness h forming a plane O,x,y, the electromechanical system having a base and at least one measurement cell comprising a proof mass linked to the base by at least one blade for guiding the proof mass as claimed in claim 1, wherein the system is monolithic.

7. The micro-machined electromechanical system as claimed in claim 6, wherein the system is a resonating accelerometer.

8. The micro-machined electromechanical system as claimed in claim 6, wherein the system is a vibrating gyrometer.

* * * * *